March 28, 1950 P. W. ROM 2,502,233
COOKING OVEN

Filed Feb. 15, 1947 2 Sheets-Sheet 1

INVENTOR.
Palmer W. Rom
Louis O. French
Att'y.

March 28, 1950 P. W. ROM 2,502,233
COOKING OVEN
Filed Feb. 15, 1947 2 Sheets-Sheet 2
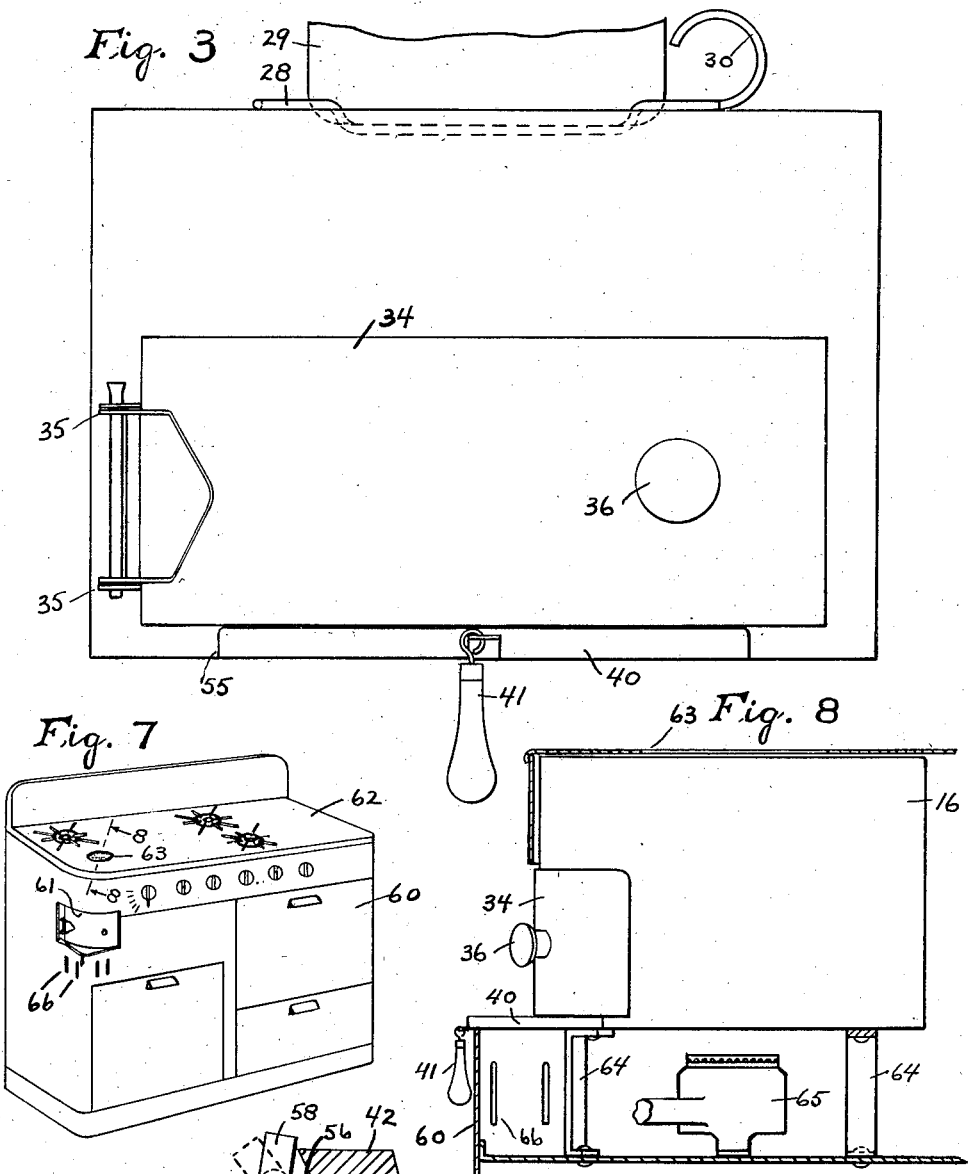
INVENTOR.
Palmer W. Rom
BY
Louis O. French
Att'y.

Patented Mar. 28, 1950

2,502,233

UNITED STATES PATENT OFFICE 2,502,233

COOKING OVEN

Palmer W. Rom, Cudahy, Wis.

Application February 15, 1947, Serial No. 728,897

4 Claims. (Cl. 126—275)

The invention relates to culinary ovens.

The general object of the invention is to provide an oven in which several cooking operations can be carried out at the same time from a single source of heat and at high efficiency for the heat units used.

One object of this invention is to provide an improved means for mounting the baking tray within the oven whereby the tray may be rotated, said tray preferably also being mounted on a support slidably mounted in the oven to permit the tray to be moved laterally out of the oven to a position in which it may be removed from said support.

A further object of the invention is to provide a baking or roasting tray which is mounted on and in spaced relation to a plate disposed above the burner, and which tray preferably has a heat insulated bottom. Also the sides of the tray are outwardly flared to prevent searing hot gases coming directly in contact with the food placed therein.

A further object of the invention is to improve the baffle construction shown in my copending application Serial No. 694,449, filed September 3, 1946, now Patent No. 2,454,571, November 23, 1948, for "Culinary oven," by providing depending cylindrical baffle portion spaced from the oven walls to aid in circulating the hot gases about a cooking utensil that may be set down into the top opening of the oven.

A further object of the invention is to provide a simple form of self-centering utensil grid for carrying utensils in the intermediate and top portions of the oven.

A further object of the invention is to provide a simple means for limiting the outward sliding movement of the sliding tray relative to the oven.

The invention further consists in the several features hereinafter described and more particularly defined by claims at the conclusion hereof.

In the drawings:

Fig. 3 is a side elevation view of the oven, part of a utensil associated therewith being broken away;

Fig. 4 is a detailed sectional view taken on the line 4—4 of Fig. 2;

Fig. 5 is a detailed plan view of one of the upper grids;

Fig. 6 is a detailed sectional view taken on the line 6—6 of Fig. 2;

Fig. 7 is a perspective view showing an oven embodying the invention as built into a stove;

Fig. 8 is a detailed vertical sectional view taken on the line 8—8 of Fig. 7.

Figure 1:
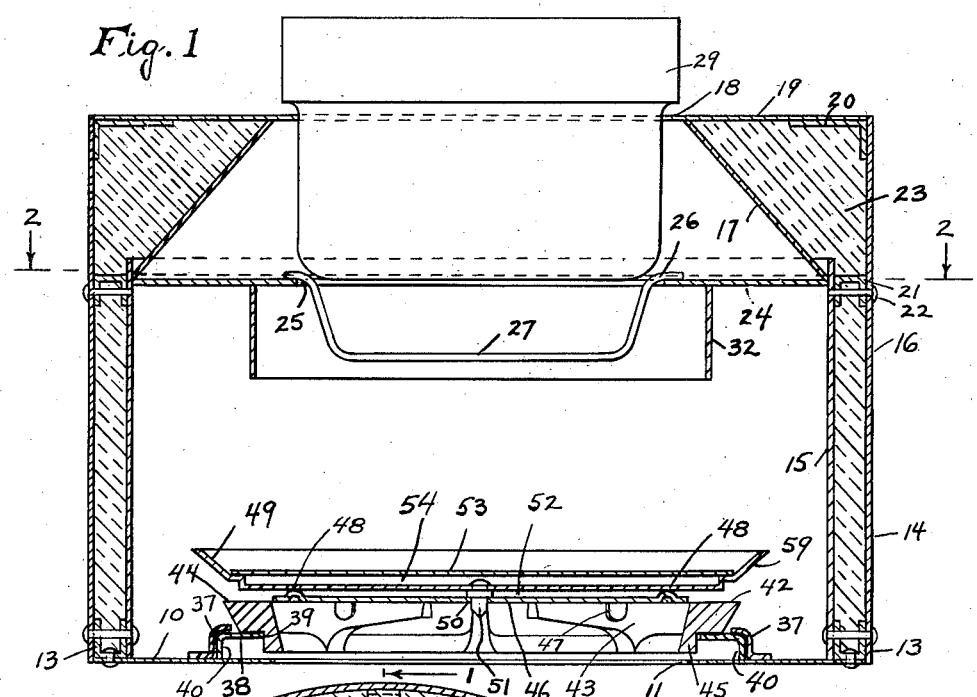
Fig. 1 is a vertical sectional view through an oven embodying the invention taken on the line 1—1 of Fig. 2.

Referring to the drawings, the oven includes a metal base plate 10 which in the hot plate burner type of application may comprise an annular metal ring but which in other uses may be of other forms providing a central opening 11 and a plurality of small peripherally disposed openings 12, said plate in the case of a gas burner adapted to rest on the usual burner top grate. The plate 10 has at its outer edge a plurality of U-shaped side wall anchoring metal clips 13 riveted thereto to which the outer cylindrical metal wall 14 and the innner metal wall 15 of a housing or hood 16 are secured by rivets.

The inner wall 15 is of cylindrical shape from its bottom to an intermediate point and then frusto-conically formed by walls 17 either integral with or secured to the cylindrically formed walls and converging to a central disposed opening 18 in an annular top wall 19 which is secured at its periphery to the outer wall 14 in any suitable manner as by angled brackets 20 brazed or riveted to said walls. The walls 15 and 14 are also secured together intermediate their ends in spaced relation by metal clips 21 and rivets 22. The space between the inner and outer walls is filled with suitable heat insulating material 23 of either sheet or fiber form, so that the inner wall 15 of the hood is completely heat insulated.

Where the inner walls 15 start to converge, a baffle 24 of sheet metal is secured to said walls. This baffle is provided with a central opening 25 over which a self-centering U-shaped wire grid 26 is mounted, the legs 27 of said grid being depressed as shown in Fig. 1 to receive the bottom of a utensil that may be placed upon them and being equidistantly spaced apart relative to the center of said opening. A grid 28 similar to the grid 26 may be mounted over the top opening 18, to receive a utensil 29 thereon, the only difference being that the legs of this grid have their ends 30 curved upwardly and inwardly to form handles to facilitate the removal of the grid.

The baffle 24 is also provided with a series of peripheral openings 31 and a depending tubular deflector 32 spaced a short distance from the opening 35. The baffle 24 acts to create a circulation of hot gases up through the central opening 25 and along the conical wall 17 and down through the openings 31 when, for example, the utensil 29 is mounted in the opening 18 as shown in Fig. 1 and the deflector 32 has been found to materially assist this circulatory action of said gases.

Access to the lower portion of the hood is through an opening 33 closed by a heat insulated door 34 hinged at 35 to the lower outer side wall of the hood and secured in closed position either by its own weight or a suitable latch, said door carrying a handle 36.

The base plate 10 is provided with angled spaced apart guides 37, and a sheet metal plate 38 having an opening 39 therein and angled sides 40 forms a tray or movable support which is slidably mounted on the bottom of said plate and between said guides and carries a handle 41.

Figure 2:
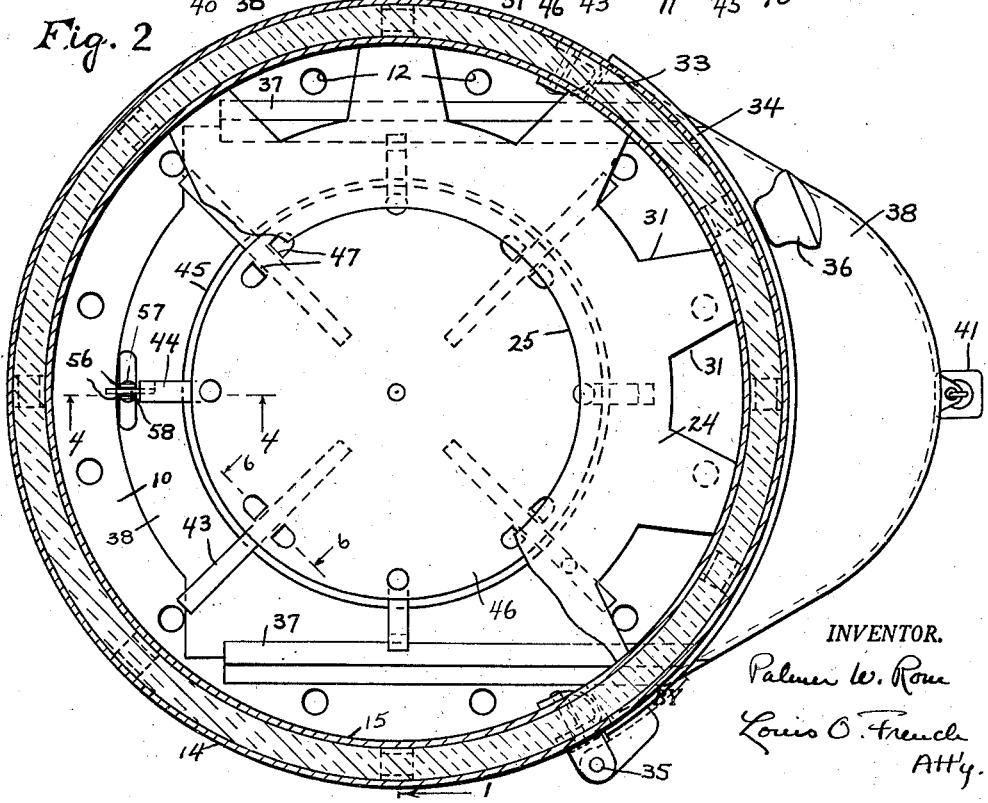
Fig. 2 is a horizontal sectional view taken on the line 2—2 of Fig. 1, parts being broken away and the intermediate grid and lower tray being removed.

A ringed spider grate member 42 having long radially disposed grid arms 43 interspaced with shorter grid arms 44 formed integral with a ring portion 45 has said ring portion mounted in the opening 39 as shown in Fig. 1 and Fig. 2. Fig. 2 shows a pin projection in dotted lines beneath one of the radially disposed arms 43 at the lower right hand portion of said figure which engages in an aperture in the tray 38 to hold said grate in a fixed position relative to said tray.

A sheet metal plate or disk 46 is mounted over the opening in the grate 42 formed by the ring portion 45 and is secured thereto against movement by sets of depending spaced ears 47 punched downwardly from the face of said disk and straddling the longer grid arms 43 as shown in Fig. 6. The disk 46 has a series of radially disposed protuberances or raised portions 48 projecting from its top surface upon which a baking or roasting pan 49 is supported and is provided with a centering hole 50 to receive a pivot pin 51 projecting from the base of the pan 49, so that the pan 49 may be revolved to any desired angular position. Thus the rotatable pan 49 is separated from the disk 46 by an air space 52, and the pan itself also is preferably provided with a false or removable bottom plate 53 which forms with the actual bottom an air space 54, or said space 54 may be filled with a suitable insulating material, if desired. These heat insulating spaces 52 and 54 have been found very beneficial in the cooking of bakery products such as bread, pie, biscuits, and cake, as they act to prevent the forming of a hard crust on such products.

The tray carrying the pan 49 works through a recess 55 in the wall of the hood, but to prevent its complete removal it is provided as shown in Figs. 2 and 4 with spaced ears 56 carrying a pin 57 upon which a gravity latch 58 is mounted, said latch being in the dotted line position when the tray is pushed all the way into the hood as shown in Fig. 2, but being in the full line stop position and engageable with the side of the opening 11 of the base plate when the tray is in its withdrawn position.

The sides 59 of the pan 49 are preferably flared outwardly to prevent the hot searing gases from coming into direct contact with food placed in said pan.

Instead of mounting the oven over the top burner of an ordinary stove, the oven above described may be arranged as shown in Figs. 7 and 8 within the body of the stove 60 itself. When so arranged, a portion of the cover of the stove is cut away to provide an opening 61 for the door 34 and the tray member 38 and the top 62 of the stove has an opening 63 alined with the opening 18, the oven being supported within the interior of the stove by brackets 64, a burner 65 being mounted in the stove below the plate 10 and centered relative to its opening 11, air inlets slots 66 being provided in the outer wall of the stove.

With the above described arrangement, baking or roasting operations may be effected in the lower compartment when using the pan 49 and the plate or disk 46 or broiling, frying, or boiling of food with the utensil directly mounted on the grid 42, boiling or baking operations may be effected in a utensil that may be placed on the grid 26 carried by the baffle 24 and boiling on the top with the grid 28 in place or frying with or without said grid 28, or the utensil 29 may be placed as shown in Fig. 1 for quickly heating the contents therein to the boiling point at the same time warming up the oven. With the pan 49 and plate 46 removed, the utensil 29 as arranged in Fig. 1 is directly exposed to the source of heat.

With the apparatus arranged as shown in Fig. 1, the utensil 29 blocks off the top opening 18, but active circulation of the heated gases is effected, nevertheless, since the gases pass up through the central opening 11 in the bottom plate 10, the central opening of the grate member 42, and the central opening 25 in the baffle 24 to the upper portion of the oven where they are deflected downwardly by the blocking utensil 29 and the walls 17 through the openings 31 in said baffle and then pass downwardly along the walls 15 and out through the openings 12 in the bottom plate 10. Tests with a device constructed in accordance with Fig. 1 confirm this circulatory action. Thus the hot gases from the burner do not give their heat directly to the walls 15 but are heat insulated therefrom by the stream of gases passing downwardly along the walls 15 to the outlets 12. This circulatory action of the gases in my device is important because it gets the most out of the heat from the burner and does not rely on heat conduction effect from the walls of the oven to furnish the cooking heat. It will also be noted that this same circulatory effect of the gases within the oven takes place to a lesser extent when the top opening 18 is partly closed off by a cooking utensil 29 as shown in Fig. 3.

The above described device has been found to be very economical in the use of gas when gas is used as the heat source.

I desire it to be understood that this invention is not to be limited to any particular form or arrangement of parts except in so far as such limitations are included in the appended claims.

What I claim as my invention is:

1. An oven comprising a base having a central opening, a hood on said base having a side opening, an apertured tray slidably mounted relative to said base and movable laterally through said side opening, a grate mounted over the aperture of said tray, a plate removably mounted on said grate and provided with radially disposed raised portions, and a pan resting on the raised portions of said plate and pivotally connected at its center therewith.

2. An oven having a base provided with a large central burner opening and a plurality of peripherally disposed openings radially of said burner opening, a hood carried by said base including an inner heat insulated metal wall, the upper portion of which converges to an opening in the top of the hood adapted to be closed or partly closed by a cooking utensil, a baffle below the converging portion of said hood having side openings adjacent the wall and a central opening with a depending tubular deflector depending from said baffle and axially alined with and of larger diameter than said opening, said side openings in said baffle and said peripheral openings in said base permitting gases to pass upwardly through said central openings and deflector and downwardly along the inner wall of said hood when said top opening is closed or partly closed.

3. An oven comprising a base having a central opening, a hood on said base having a side opening, an apertured tray slidably mounted relative to said base and movable laterally through said side opening, a grate mounted over the aperture of said tray and having a central opening and arms projecting radially into said opening, a plate having a plurality of sets of depending spaced projections, each set of projections engaging the sides of one of said arms to hold said plate against movement relative to said grate, and a pan resting on portions of said plate and revolubly connected at its center therewith.

4. An oven comprising a base having a central opening for placement over a burner, a hood on said base having a side opening, an apertured tray slidably mounted relative to said base and burner and movable laterally through said side opening, a grate mounted over the aperture of said tray and having a central opening, a plate removable from but fixed on said grate against movement, and a pan resting on portions of said plate and revolubly connected at its center therewith.

PALMER W. ROM.

REFERENCES CITED

The following references are of record in the file of this patent:

UNITED STATES PATENTS

| Number | Name | Date |
|---|---|---|
| 177,703 | Esser | May 23, 1876 |
| 237,526 | Hasselhoff et al. | Feb. 8, 1881 |
| 319,003 | McDonald et al. | June 2, 1885 |
| 592,460 | Welz | Oct. 26, 1897 |
| 772,999 | Boeck | Oct. 25, 1904 |
| 796,593 | Mohan | Aug. 8, 1905 |
| 903,834 | Boeddener | Nov. 17, 1908 |
| 1,624,989 | Smith et al. | Apr. 19, 1927 |
| 1,740,785 | Rogers et al. | Dec. 24, 1929 |
| 1,755,603 | Kass | Apr. 22, 1930 |
| 1,869,899 | Kuckel | Aug. 2, 1932 |
| 1,940,461 | Noble | Dec. 19, 1933 |
| 1,980,131 | Flanagan | Nov. 6, 1934 |
| 2,006,385 | Dikeman | July 2, 1935 |
| 2,070,055 | Levien | Feb. 9, 1937 |
| 2,300,405 | Cook | Nov. 3, 1942 |
| 2,314,248 | Rutledge | Mar. 16, 1943 |
| 2,413,204 | Wolff | Dec. 24, 1946 |

FOREIGN PATENTS

| Number | Country | Date |
|---|---|---|
| 206,931 | Great Britain | Nov. 19, 1923 |
| 648,637 | France | Aug. 14, 1928 |